United States Patent
Gu et al.

(10) Patent No.: US 12,203,006 B2
(45) Date of Patent: Jan. 21, 2025

(54) SILICA-BASED MATTING AGENTS AND METHODS OF MAKING AND USING THE SAME

(71) Applicant: W.R. Grace & Co.-Conn., Columbia, MD (US)

(72) Inventors: Feng Gu, Ellicott City, MD (US); James Neil Pryor, West Friendship, MD (US)

(73) Assignee: W.R. Grace & Co.-Conn., Columbia, MD (US)

( * ) Notice: Subject to any disclaimer, the term of this patent is extended or adjusted under 35 U.S.C. 154(b) by 932 days.

(21) Appl. No.: 16/634,363

(22) PCT Filed: Aug. 3, 2018

(86) PCT No.: PCT/US2018/045096
§ 371 (c)(1),
(2) Date: Jan. 27, 2020

(87) PCT Pub. No.: WO2019/028312
PCT Pub. Date: Feb. 7, 2019

(65) Prior Publication Data
US 2021/0017405 A1    Jan. 21, 2021

Related U.S. Application Data

(60) Provisional application No. 62/540,920, filed on Aug. 3, 2017.

(51) Int. Cl.
C09D 7/42    (2018.01)
B05D 5/02    (2006.01)
(Continued)

(52) U.S. Cl.
CPC .......... C09D 7/42 (2018.01); B05D 5/02 (2013.01); C09C 1/3072 (2013.01); C09D 7/61 (2018.01);
(Continued)

(58) Field of Classification Search
None
See application file for complete search history.

(56) References Cited

U.S. PATENT DOCUMENTS 2,838,413 A    6/1958    Young
3,607,337 A    9/1971    Eisenmenger
(Continued)

FOREIGN PATENT DOCUMENTS

| CN | 1328504 A | 12/2001 |
|---|---|---|
| CN | 1355830 A | 6/2002 |

(Continued)

OTHER PUBLICATIONS

Barrett et al., "The Determination of Pore Volume and Area Distributions in Porous Substances. I. Computations from Nitrogen Isotherms", J. Am. Chem. Soc., 1951, pp. 373-380, vol. 73.
(Continued)

Primary Examiner — Ronak C Patel
(74) Attorney, Agent, or Firm — DORITY & MANNING, P.A.

(57) ABSTRACT

Improved silica-based matting agents are disclosed. The matting agents are useful in waterborne coatings composition to provide exceptional properties to a wood based substrate. Films resulting from the silica-based matting agents on a wood substrate unexpectedly provide improved chemical resistance and/or film clarity to the surface of the wood substrate. Methods of making and using the matting agents are also disclosed.

18 Claims, 1 Drawing Sheet

(51) Int. Cl.
*C09C 1/30* (2006.01)
*C09D 7/40* (2018.01)
*C09D 7/61* (2018.01)
*C09D 7/62* (2018.01)
*C09D 15/00* (2006.01)

(52) U.S. Cl.
CPC ............... *C09D 7/62* (2018.01); *C09D 7/69* (2018.01); *C09D 15/00* (2013.01); *C01P 2004/61* (2013.01); *C01P 2006/14* (2013.01); *C01P 2006/62* (2013.01)

(56) References Cited

U.S. PATENT DOCUMENTS

| | | |
|---|---|---|
| 3,816,154 A | 6/1974 | Baldyga et al. |
| 4,038,224 A | 7/1977 | Eisenmenger et al. |
| 4,097,302 A | 6/1978 | Cohen et al. |
| 4,330,446 A | 5/1982 | Miyosawa |
| 5,034,207 A | 7/1991 | Kerner et al. |
| 5,221,337 A | 6/1993 | Luers et al. |
| 5,326,395 A | 7/1994 | Aldcroft et al. |
| 5,366,645 A | 11/1994 | Sobottka |
| 5,562,978 A | 10/1996 | Jacobson |
| 5,637,636 A | 6/1997 | Cartwright et al. |
| 5,786,415 A | 7/1998 | Blanchard et al. |
| 6,039,798 A | 3/2000 | Aldcroft et al. |
| 6,103,004 A | 8/2000 | Belligoi et al. |
| 6,383,280 B1 | 5/2002 | Siray et al. |
| 6,395,247 B1 | 5/2002 | Siray et al. |
| 6,531,524 B2 | 3/2003 | Ring et al. |
| 6,627,139 B2 | 9/2003 | Park et al. |
| 6,770,128 B1 | 8/2004 | Lueers et al. |
| 6,800,267 B2 | 10/2004 | Schubert et al. |
| 6,921,781 B2 | 7/2005 | Schubert et al. |
| 7,117,766 B1 | 10/2006 | Boehringer |
| 7,303,624 B2 | 12/2007 | Meyer et al. |
| 7,305,271 B2 | 12/2007 | Eriksson |
| 7,393,571 B2 | 7/2008 | Chapman et al. |
| 7,490,785 B2 | 2/2009 | Weidhaus |
| 7,596,894 B1 | 10/2009 | Currey |
| 7,733,932 B2 | 6/2010 | Faybishenko |
| 8,864,056 B2 | 10/2014 | Paulat et al. |
| 8,926,748 B2 | 1/2015 | Lehnert et al. |
| 9,139,736 B2 | 9/2015 | Lindner et al. |
| 9,266,115 B2 | 2/2016 | Kragten et al. |
| 9,546,285 B2 | 1/2017 | Gebauer et al. |
| 2002/0055556 A1 | 5/2002 | Schubert et al. |
| 2003/0078334 A1 | 4/2003 | Doles et al. |
| 2003/0158315 A1 | 8/2003 | Herbiet et al. |
| 2003/0171475 A1 | 9/2003 | Miyazaki et al. |
| 2004/0047792 A1 | 3/2004 | Schubert et al. |
| 2004/0097631 A1 | 5/2004 | Morris et al. |
| 2004/0121156 A1 | 6/2004 | Meyer et al. |
| 2004/0127604 A1 | 7/2004 | Meyer et al. |
| 2004/0249049 A1 | 12/2004 | Christian et al. |
| 2005/0014866 A1 | 1/2005 | Hohner et al. |
| 2005/0065268 A1 | 3/2005 | Morea-Swift et al. |
| 2005/0192367 A1 | 9/2005 | Ou et al. |
| 2005/0287348 A1 | 12/2005 | Faler et al. |
| 2006/0032146 A1* | 2/2006 | Partch .............. H01L 21/3212 51/298 |
| 2006/0052236 A1 | 3/2006 | Angevine et al. |
| 2006/0134423 A1 | 6/2006 | Malet et al. |
| 2006/0257643 A1 | 11/2006 | Birger |
| 2008/0182040 A1 | 7/2008 | Chereau et al. |
| 2008/0254303 A1 | 10/2008 | Ramsey |
| 2009/0098367 A1 | 4/2009 | Wenzel et al. |
| 2010/0071593 A1* | 3/2010 | Lehnert .................. C09C 3/10 106/270 |
| 2010/0083876 A1 | 4/2010 | Lahary et al. |
| 2010/0087603 A1 | 4/2010 | Brittain et al. |
| 2010/0189993 A1 | 7/2010 | Mori et al. |
| 2010/0279123 A1 | 11/2010 | Yokoyama et al. |
| 2010/0288164 A1 | 11/2010 | Schubert et al. |
| 2011/0040013 A1 | 2/2011 | Tsapatsis et al. |
| 2011/0092632 A1 | 4/2011 | Brand et al. |
| 2011/0177306 A1* | 7/2011 | Isojima ................ A61K 9/5153 428/203 |
| 2011/0213083 A1 | 9/2011 | Takamura et al. |
| 2011/0229540 A1 | 9/2011 | Canham et al. |
| 2011/0236493 A1 | 9/2011 | Canham et al. |
| 2012/0142845 A1 | 6/2012 | De Winter et al. |
| 2012/0202914 A1 | 8/2012 | Benner et al. |
| 2012/0225290 A1 | 9/2012 | Hartmann et al. |
| 2013/0079433 A1 | 3/2013 | Lindner et al. |
| 2013/0243682 A1 | 9/2013 | Park et al. |
| 2013/0261272 A1 | 10/2013 | Herzog et al. |
| 2013/0280910 A1 | 10/2013 | Ihnfeldt |
| 2014/0045958 A1 | 2/2014 | Kraiter |
| 2014/0050928 A1 | 2/2014 | Gebauer et al. |
| 2016/0177408 A1 | 6/2016 | Watanabe |
| 2017/0306164 A1 | 10/2017 | Jo et al. |
| 2018/0066141 A1 | 3/2018 | Roland |
| 2018/0251642 A1 | 9/2018 | Van Meulder |
| 2020/0123389 A1 | 4/2020 | Gu |

FOREIGN PATENT DOCUMENTS

| | | |
|---|---|---|
| CN | 1585800 A | 2/2005 |
| CN | 102031035 A | 4/2011 |
| CN | 102217005 A | 10/2011 |
| CN | 103013325 B | 3/2016 |
| CN | 104087151 B | 9/2016 |
| CN | 104231904 A | 10/2016 |
| CN | 106009780 A | 10/2016 |
| CN | 106118448 A | 11/2016 |
| CN | 106273946 A | 1/2017 |
| CN | 106800812 A | 6/2017 |
| CN | 104949972 A | 9/2018 |
| CN | 108912991 A | 11/2018 |
| CN | 109777265 A | 5/2019 |
| CN | 110358438 A | 10/2019 |
| CN | 110791183 A | 2/2020 |
| CN | 110964432 A | 4/2020 |
| CN | 110997785 A | 4/2020 |
| CN | 111655774 B | 9/2020 |
| DE | 1592865 A1 | 2/1971 |
| DE | 2521361 A1 | 11/1976 |
| DE | 40 32 619 A1 | 4/1992 |
| DE | 69800608 T2 | 6/2001 |
| DE | 69431927 T2 | 9/2003 |
| DE | 10253193 A1 | 6/2004 |
| DE | 102016224274 A1 | 6/2017 |
| EP | 0 442 325 A1 | 8/1991 |
| EP | 0 541 359 A1 | 5/1993 |
| EP | 0442325 B2 | 10/1997 |
| EP | 0759959 B1 | 6/1998 |
| EP | 1323786 A1 | 7/2003 |
| EP | 1582569 A1 | 10/2005 |
| EP | 1789719 A2 | 5/2007 |
| EP | 1828322 B1 | 12/2009 |
| EP | 1744223 B1 | 12/2011 |
| EP | 2571808 A1 | 3/2013 |
| EP | 2580291 B1 | 8/2014 |
| EP | 2760569 A2 | 8/2014 |
| EP | 3192835 A1 | 7/2017 |
| EP | 3272817 A1 | 1/2018 |
| EP | 2935971 B1 | 2/2018 |
| FR | 2902781 A1 | 12/2007 |
| GB | 470699 A1 | 8/1937 |
| GB | 1 363 039 A | 8/1974 |
| JP | S494550 A | 1/1974 |
| JP | H09-025440 A | 1/1997 |
| JP | H9110413 A | 4/1997 |
| JP | H1160231 A | 3/1999 |
| JP | H11-305448 A | 11/1999 |
| JP | 2006-521411 A | 9/2006 |
| JP | 2010-000409 A | 1/2010 |
| JP | 2010-521539 A | 6/2010 |
| JP | 2011-500986 A | 1/2011 |
| JP | 2014-177598 A | 9/2014 |
| JP | 2014-189687 A | 10/2014 |
| JP | 2021-052146 A | 4/2021 |

(56) References Cited

FOREIGN PATENT DOCUMENTS

| WO | 9951692 A1 | 10/1999 |
| WO | WO-2004/055120 | 7/2004 |
| WO | WO-2008/068003 | 6/2008 |
| WO | 2018222960 A | 12/2018 |
| WO | 2019028312 A1 | 2/2019 |

OTHER PUBLICATIONS

PCT/US2018/035546 Search Report and Written Opinion, dated Aug. 28, 2018.
PCT/US2018/045096 Search Report and Written Opinion, dated Sep. 26, 2018.
EP3630882 Third Party Submission, dated Mar. 3, 2020.
Decision of Rejection on CN Application No. 201880050316.8 dated Feb. 16, 2022 (English translation included, 6 pages).
Examination Report on IN Application No. 201917053429 dated Jul. 12, 2021 (English translation included, 6 pages).
Examination Report on IN Application No. 202017006266 dated Nov. 25, 2021 (English translation included, 6 pages).
Extended European Search Report on EP Application No. 18810154.7 dated Jan. 21, 2021 (6 pages).
First Office Action and Search Report on CN Application No. 201880056561.X dated Feb. 8, 2022 (English translation included, 25 pages).
First Office Action on CN Patent Application No. 201880050316.8 dated Mar. 2, 2022 (English translation included, 12 pages).
International Preliminary Report on Patentability in PCT/US2018/035546 dated Dec. 12, 2019 (8 pages).
International Preliminary Report on Patentability in PCT/US2018/045096 dated Feb. 13, 2020 (11 pages).
Munzing: "Ceretan MXS 3815" Jun. 1, 2016, Retrieved from the Internet: URL: https://www.munzing.com/static/a8897a272bca7ac60256b25e2dafb484/td_CERETAN_MXS_3815_en_53b7a8e3f0.pdf, Accessed Dec. 21, 2020 (1 page).
Notification of Reasons for Rejection on JP Application No. 2019-566675 dated Dec. 17, 2021 (English translation included, 17 pages).
Search Report and Written Opinion on SG Application No. 11201911371V dated Jan. 14, 2021 (10 pages).
Search Report and Written Opinion on SG Application No. 11202000946R dated Dec. 24, 2020 (11 pages).
Second Office Action on CN Application No. 201880050316.8 dated Oct. 14, 2021 (English translation included, 7 pages).
Third Party Observation on EP Patent No. 3630882 (Application No. 18810154.7 dated Oct. 29, 2021 (English translation not available, 8 pages).
Morrow et al., "A Kinetic Investigation into the effect of silica properties on the photo-oxidation of a water based silica coating"; Polymer Degradation and Stability, Barking, GB., vol. 66, No. 1 Oct. 1, 1999, pp. 95-105.
EP 18 841 056.7 EP Search Report Apr. 14, 2021.
"Intelligence for Coatings Silica Products," Grace Davison - Materials & Packing Technologies (2010) (10 pages).
Foreign Action on JP7308185 dated Mar. 18, 2024 (English Translation Attached) (88 pages).
Jis Z 8831-3:2010, "Pore Size Distribution And Porosity Of Solid Materials—Part 3: Analysis Of Micropores By Gas Adsorption" Apr. 20, 2010 (56 pages) (English ABS Attached).

\* cited by examiner

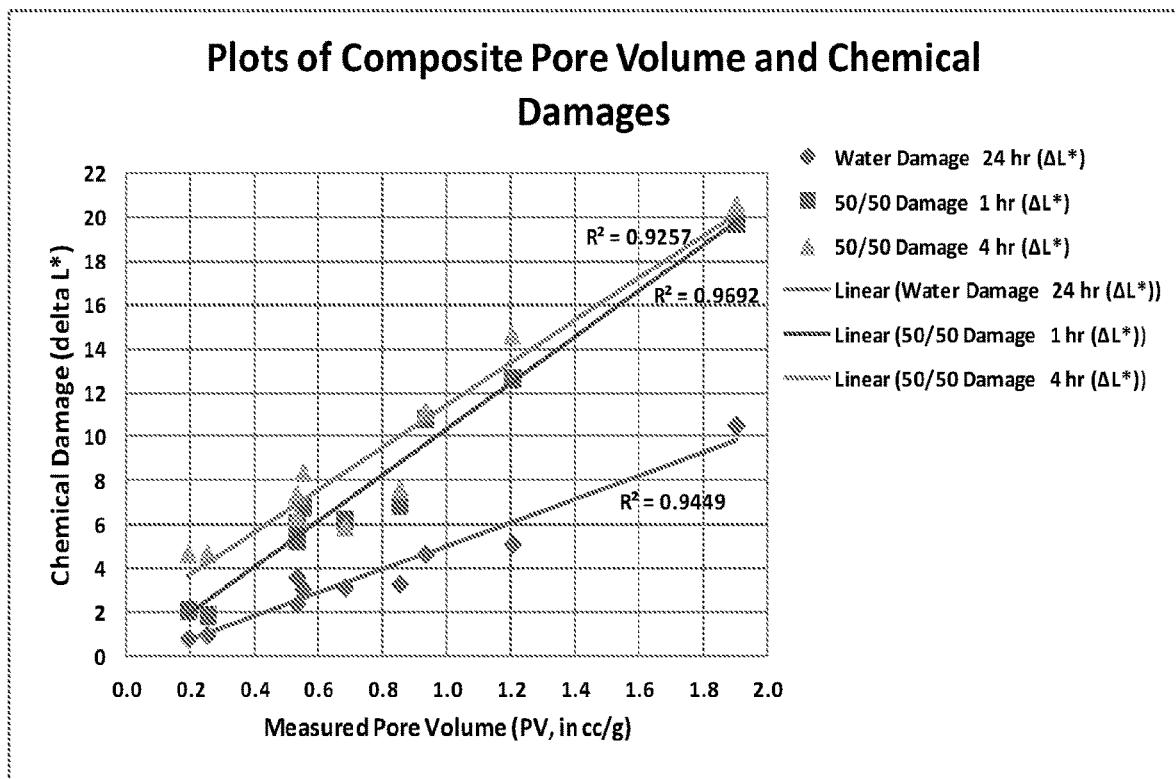

SILICA-BASED MATTING AGENTS AND METHODS OF MAKING AND USING THE SAME

This application is being filed as a PCT International Patent Application in the name of W. R. Grace & Co.-Conn., a U.S. company, on 3 Aug. 2018, designating all countries, and claiming priority to U.S. Provisional Patent Application Ser. No. 62/540,920, filed on 3 Aug. 2017, and entitled "SILICA-BASED MATTING AGENTS AND METHODS OF MAKING AND USING THE SAME."

FIELD OF THE INVENTION

The present invention is directed to improved silica-based matting agents. In one aspect, the present invention relates to improved silica-based matting agents for waterborne coating systems. In another aspect, the invention relates to silica-based matting agents comprising low porosity silica particles, aqueous coating compositions containing the silica-based matting agents and methods of making and using the compositions

BACKGROUND

Silica-based matting agents are widely used in coating and painting formulations to reduce the gloss of the coated films. In solvent based coating or 100% solid UV-cure formulations, high levels of silica are required for effective gloss reduction and matting. On the other hand, high concentration of hydrophilic silica can cause changes in the rheological properties of the solvent based lacquer and can often have dispensability and settling problems. To solve these problems, typically the prior art is targeted at treating the surface of particulate silica to make the surface thereof hydrophobic and thus more compatible with solvent systems and organics in the formulations. To this end, wax and/or polymer coated silicas have often been used.

U.S. Pat. No. 6,039,798 discloses wax coated silica matting agent wherein the silica is an amorphous silica having a pore volume of at least 1.5 cm$^3$/g, preferably at least 1.8 cm$^3$/g. The wax coating is present in the range from 6% to 15% by weight (wt %) of the matting agent and comprises a synthetic polyethylene wax.

EP0759959 discloses wax coated silica matting agent characterized in that the silica is an amorphous silica having a pore size distribution wherein 90% of the pores have a diameter above 15 nanometers, and less than 20% of the pore volume is in pores having a pore diameter between 10 and 30 nanometers, the wax coating being present in the range from about 2% to about 15% by weight of the matting agent and comprising a hard microcrystalline wax, a plasticizing microcrystalline wax, a synthetic polyethylene wax, or a mixture thereof.

US20050065268 discloses a silica matting agent comprises particulate amorphous silica in which the particles of silica have been treated with a hydrophilic polyolefin wax.

U.S. Pat. No. 6,921,781 discloses coating at least a portion of a surface of at least one silica particle with at least one wax, wherein the coating is carried out in at least one gas at a temperature above the melting point of the wax and below the decomposition temperature of the wax. The wax content is defined as 2-15% weight of that of silica.

U.S. Pat. No. 7,303,624 discloses a structurally coated silica can be prepared by spraying and mixing a pyrogenic silica with water and a coating agent in a suitable mixing vessel, then milling and then conditioning the product.

U.S. Pat. No. 8,926,748 discloses a matting agent useful for the preparation of matted coatings comprising, inorganic oxide particulates; and wax coated on the inorganic oxide particulates, wherein the wax possesses a crystallinity of about 50% or more and said wax is present in an amount ranging from 15 wt % to 30 wt % based on a total weight of said matting agent.

WO 1999051692 discloses an invention relating to a matting agent based on silicon dioxide, the silicon dioxide particles having a particle size of 2.5 to 20 µm and a moisture content of 0 to 65 wt %, based on the matting agent, and being coated with 0.2 to 10 wt % of a urea-urethane derivative or a mixture of urea-urethane derivatives.

Currently, solvent-based coating compositions are undesirable due to environmental concerns and safety and health issues. Government regulations have pushed for the reduction and elimination of volatile organic compounds (VOC) in paint or coating formulations and the use of substantially more waterborne coatings is promoted.

Various types of matting agents have been used in waterborne formulations, including, silica matting agents, organic matting agents, and blends of the two.

Silica-based matting agents such as Acematt® TS100, Syloid® C807 have excellent matting efficiency, and film clarity in water borne formulations, but tend to have poorer chemical resistance and weather resistance, often whitening or turning cloudy when exposed to chemicals or changing weather conditions. Silica-based matting agents also tend to have poor thermal stress resistance when subjected to rapid change of temperatures. While not wishing to be bound by any particular theory, an adhesive failure at the matting agent-latex interface resulting in a fissure that is an effective scatter of light as well as adhesive failure caused by stresses due to swelling (then shrinkage) of the film during wetting and drying of the film and is aggravated by particle shrinkage of the matting particles during drying, may be the cause of these drawbacks with silica matting agents in waterborne coating formulation. All these drawbacks are undesirable in coating applications on wood substrates.

Pure organic based organic matting agents have also been used. For example, urea-formaldehyde resin based matting agents, such as Deuteron® MK, and Ceraflour® 920 are known. However, both of these matting agents have environmental concerns since they can potentially release residual starting material, toxic formaldehyde. A modified, micronized polyethylene based matting agent Ceraflour® 929 is also available. However, this product has poor matting efficiency when compared to silica-based matting agents in coating formulations. It is also known that organic matting agents have poorer film clarity when compared to pure silica-based matting agents. This is probably due to the fact that silica-based matting agents have a refractive index close to that of other components (for example, binders) in the coated film, whereas the difference in the refractive index of organic based matting agents and such components is larger. In addition, organic matting agents are typically more difficult to produce and more expensive as well.

The blending of silica-based matting agents and organic matting agents has also been used in water borne systems to balance the required coating film properties. However, this creates additional complexity in already complicated paint or coating formulation systems.

Consequently, there remain a need for simple solutions to develop matting agents that (i) are suitable for use in aqueous coating systems, and (ii) provide clear coat films having improved chemical resistance and/or improved film clarity in combination with good matting efficiency.

SUMMARY

The present invention addresses the aforementioned need in the art by the discovery of improved silica-based matting agents which provide good matting efficiency in combination with increased chemical resistance in a coated film resulting from "waterborne" or aqueous coating compositions. Unexpectedly, it has been found that the incorporation of silica particles having a relatively low porosity (e.g., less than or equal to about 1.2 cc/gm) as matting agents in aqueous coating compositions provide increased chemical resistance in films formed from the dried coating composition, in particular, when applied onto a wood substrate. Advantageously, the aqueous compositions of the present invention also provide exceptional properties of improved film clarity to the surface of a wood substrate when compared to prior aqueous coated compositions.

Accordingly, the present invention provides silica-based matting agents comprising porous silica particles having a total pore volume of less than or equal to about 1.2 cubic centimeters per gram (cc/gm) as determined by Barrett-Joyner-Halenda (BJH) method. The porous silica particles may be uncoated or coated porous silica particles.

In a desired embodiment, the silica-based matting agent comprises coated or composite silica particles wherein the particles are coated or treated with at least one component selected from (i) one or more waxes, (ii) one or more polymers, or (iii) any combination of (i) and (ii) in a manner such that the final composite silica particles have a total pore volume of less than or equal to about 1.2 cc/gm as determined by the BJH method.

The present invention also provides aqueous coating compositions or formulations comprising the improved silica-based matting agents of the invention which compositions, upon drying, provide dried "clear coat" films having improved chemical resistance. For purposes of the invention, the term "clear coat" film is used herein to indicate a film which is transparent or substantially transparent such that the natural grain of a wood substrate is substantially visible to the human eye when applied onto at least one surface of a wood substrate. In some exemplary embodiments, the coating compositions of the invention having the improved matting agents of the invention present in an amount sufficient, upon drying, to achieve a 60° gloss value of between 10.0 and 15.0 in the dried clear coat film when drawdowns are carried out on a plain, smooth and non-penetrating black chart with the coating composition, provide films which exhibit a 50/50 water/ethanol damage 4 hr $\Delta L^*$ of less than 15.0 units as measured using a portable Spectro-Guide 45/0 colorimeter in accordance with methods described herein below. In some desired embodiments, the aqueous coating composition in accordance with the invention having the improved matting agents of the invention present in an amount sufficient, upon drying to achieve a 60° gloss value of between 10.0 and 15.0 in the dried film, provide clear coat films which exhibits at least one of (a) a 50/50 water/ethanol damage 1 hr $\Delta L^*$ of less than 13.0 units as measured using a portable Spectro-Guide 45/0 colorimeter in accordance with methods described herein below and/or (b) a water damage 24 hr $\Delta L^*$ of less than 6.0 units as measured using a portable Spectro-Guide 45/0 colorimeter and the methods described herein.

In other embodiments, in addition to the chemical resistance properties mentioned herein above, the aqueous coating composition in accordance with the invention having the improved matting agents of the invention present in an amount, upon drying, sufficient to achieve a 60° gloss value of between 10.0 and 15 in the dried film, provides a clear coat film which exhibits a film clarity $\Delta L^*$ of less than 7.0 units as measured using a portable Spectro-Guide 45/0 colorimeter in accordance with the methods described herein.

The present invention is further directed to methods of making the silica-based matting agents and method of preparing aqueous coating compositions comprising the matting agents of the invention. The present invention is also directed to methods of coating a substrate with the hereinmentioned aqueous coating compositions. In a preferred embodiment, the substrate is a wood substrate.

In other embodiments, the method of using the hereindescribed silica-based matting agents comprises a method of improving the chemical resistance and/or film clarity, or any combination thereof, of a substrate, in particularly a wood substrate, wherein the method comprises incorporating the herein-described silica-based matting agents into an aqueous coating composition prior to applying the coating composition onto the substrate. Unexpectedly, the herein-described coating compositions provide improved protection to a given wood substrate, when compared to known liquid coating compositions as measured using a colorimeter (e.g., a portable Spectro-Guide 45/0 colorimeter).

The present invention is even further directed to substrates coated with aqueous compositions containing the herein-described matting agents. In some exemplary embodiments, the substrate comprises a wood substrate coated with aqueous compositions containing the hereindescribed silica-based matting agents.

These and other features and advantages of the present invention will become apparent after a review of the following detailed description of the disclosed embodiments and the appended claims.

BRIEF DESCRIPTION OF THE FIGURES

The present invention is further described with reference to the appended FIGURE, wherein:

FIG. 1 depicts a plot of total pore volume of exemplary silica-based matting agents of the present invention versus water and chemical damage of a film containing the exemplary matting agents.

DETAILED DESCRIPTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

It must be noted that as used herein and in the appended claims, the singular forms "a", "and", and "the" include plural referents unless the context clearly dictates otherwise. Thus, for example, reference to "an oxide" includes a plurality of such oxides and reference to "oxide" includes reference to one or more oxides and equivalents thereof known to those skilled in the art, and so forth.

"About" modifying, for example, the quantity of an ingredient in a coated particle and/or composition, concentrations, volumes, process temperatures, process times, recoveries or yields, flow rates, and like values, and ranges thereof, employed in describing the embodiments of the disclosure, refers to variation in the numerical quantity that may occur, for example, through typical measuring and handling procedures; through inadvertent error in these procedures; through differences in the ingredients used to carry out the methods; and like proximate considerations. The term "about" also encompasses amounts that differ due to aging of a formulation with a particular initial concentration or mixture, and amounts that differ due to mixing or processing a formulation with a particular initial concentration or mixture. Whether modified by the term "about", the claims appended hereto include equivalents.

For purposes of this invention, the gloss values recited herein were measured when drawdowns of the aqueous coating compositions were carried out on a plain, smooth and non-penetrating black chart and dried at least for four (4) days at room temperature. All chemical resistance and film clarity values were also based on measurements on the black charts. Similar improvements were found on other types of substrate including wood.

The present invention is directed to improved silica-based matting agents that provide improved chemical resistance in films resulting from the application of an aqueous coating composition onto a substrate, preferably a wood substrate. Typically, the improved silica-based matting agents comprise porous silica particles having a low porosity, i.e. having a total pore volume of less than or equal to about 1.2 cc/gm as determined by the BJH method. The silica particles may be untreated silica particles having the requisite low porosity or may be porous silica particles which have been treated to provide the required low porosity. In either case, the treated or untreated porous silica particles useful in the present invention have a final total pore volume of any value greater than 0.01 cc/gm and up to about 1.2 cc/gm, in increments of 0.01 cc/gm, e.g., from about 0.35 cc/gm to about 0.95 cc/gm, as determined by the BJH method. In a preferred embodiment, the porous silica particles used to form the matting agents of the present invention have a total pore volume of from about 0.10 cc/gm to about 1.00 cc/gm, as determined by the BJH method. In another embodiment the porous silica particles used to form the matting agents of the invention has a total pore volume of from about 0.20 cc/gm to about 0.80 cc/gm, as determined by the BJH method.

In a desired embodiment of the invention, the matting agent comprises composite silica particles. The composite particles comprise porous silica particles having a total pore volume of at least 0.10 cc/gm or greater which are treated with (i) one or more waxes, (ii) one or more polymers, or (iii) any combination of (i) and (ii) to provide the a total pore volume of less than or equal to about 1.2 cc/gm as determined by the BJH method. Typically, the silica particles used to form the composite silica particles have a total pore volume of from about 0.10 cc/gm to about 3.00 cc/gm as determined by the BJH method.

To form the composite silica particles, the porous silica particles are treated with (i) one or more waxes, (ii) one or more polymers, or (iii) any combination of (i) and (ii) in an amount sufficient to provide composite particles having the desired low porosity, i.e. a total pore volume of less than or equal to about 1.2 cc/gm as determined by the BJH method as described herein above. Typically, the (i) one or more waxes, (ii) one or more polymers, or (iii) any combination of (i) and (ii) is coated onto the porous silica particles in any amount sufficient to partially or substantially fill the pores of the porous particles so as to provide the desired low porosity in the composite particles. In a preferred embodiment of the invention, the (i) one or more waxes, (ii) one or more polymers, or (iii) any combination of (i) and (ii) is coated onto the porous silica particles in any amount sufficient to provide the wax, polymer or any combination thereof, in at least 75%, preferably at least 85%, of the pores of the particles.

The amount of (i) the one or more waxes, (ii) the one or more polymers, or (iii) any combination of (i) and (ii) in the final composite silica particles will vary depending upon the starting porosity in porous silica used to prepare the composite particles. Typically, the (i) the one or more waxes, (ii) the one or more polymers, or (iii) any combination of (i) and (ii) is present in an amount sufficient to yield a composite particle having up to about 75.0 wt % of components (i), (ii) or (iii), based on a total weight of the composite particles. In some exemplary embodiments, the composite particles comprise components (i), (ii) or (iii) in an amount ranging from 1.0 wt % to about 70.0 wt % (or any value greater than 1.0 wt % up to and including 70.0 wt %, in increments of 0.1 wt %, for example, about 3.1 wt %, or any range of values between 1.0 and 70.0 wt %, in increments of 0.1 wt %, for example, from about 10.3 to about 37.8 wt %), based on a total weight of the composite particles. In some exemplary embodiments, the composite particles comprise components (i), (ii) or (iii) in an amount ranging from any range of values between about 2.0 and about 50.0 wt %, in increments of 0.1 wt %, for example, from about 2.3 to about 47.8 wt %), based on a total weight of the composite particles. In other embodiments, the composite particles comprise components (i), (ii) or (iii) in an amount ranging from about 5.0 wt % up to and including 67 wt % (or any value greater than 5.0 wt % up to and including 67.0 wt %, in increments of 0.1 wt %, for example, about 5.1 wt %, or any range of values between 5.0 and 67.0 wt %, in increments of 0.1 wt %, for example, from about 10.3 to about 37.8 wt %).

Suitable particulate porous silica useful to prepare the matting agents of the present invention includes, but is not limited to, silica gel, precipitated silica, fumed silica and colloidal silica. Suitable porous silica also includes, but is not limited to, ordered mesoporous silica prepared through an organic template (e.g., a surfactant) during the formation of silica particles, followed by a high temperature treatment to "burn off" the organics. Particularly preferred porous silica particles comprise silica gel or precipitated silica particles.

Preferred low porosity silica particles useful in the present invention include, but are not limited to, silica gels or precipitated silicas having BJH pore volumes of less than or equal to 1.2 cc/gm, and preferably less than 1.0 cc/gm. Commercially available porous silica particles useful in the present invention include particles available from W. R. Grace (Columbia, MD) under the trade designation SYLOID® such as SYLOID® C807 silica gel particles and SYLOID® MX106 precipitated silica particles, Sylobloc® silica particles, and Daraclar® silica particles.

In a preferred embodiment, the porous silica particles used to form the matting agents of the present invention comprise porous silica having a purity of at least about 93.0% by weight $SiO_2$, or at least about 93.5% by weight $SiO_2$, at least about 94.0% by weight $SiO_2$, at least about 95.0% by weight $SiO_2$, at least about 96.0% by weight $SiO_2$, at least about 97.0% by weight $SiO_2$, or at least about 98.0% by weight $SiO_2$ up to 100% by weight $SiO_2$ based upon the total weight of the porous silica particle.

The silica particles used to form the matting agents of the present invention may have a variety of different symmetrical, asymmetrical or irregular shapes, including chain, rod or lath shape. The porous silica particles may have different structures including amorphous or crystalline, etc. In a preferred embodiment, the porous silica particles are amorphous. The porous silica particles may include mixtures of particles comprising different compositions, sizes, shapes or physical structures, or that may be the same except for different surface treatments. Porosity of the porous silica particles may be intraparticle or interparticle in cases where smaller particles are agglomerated to form larger particles.

As used herein, the term "crystalline" means a solid material whose constituent atoms, molecules, or ions are arranged in an ordered pattern extends in all three directions, which may be measured by X-ray diffraction or differential scanning calorimetry. As used herein, the term "amorphous" means a solid material whose constituent atoms, molecules, or ions are arranged in a random, non-ordered pattern extends in all three directions, which may be determined by X-ray diffraction or differential scanning calorimetry.

As used herein, the term "BET particle surface area" is defined as meaning a particle surface area as measured by the Brunauer Emmet Teller (BET) nitrogen adsorption method.

As used herein, the phrase "total pore volume" refers to the median pore volume of a plurality of particles (i.e., any particle, silica particles or composite particles, respectively) as determined using the Barrett-Joyner-Halenda (BJH) nitrogen porosimetry as described in DIN 66134. To prevent the change of physical properties (e.g., melting) during degassing or measurement, for wax or organic containing composite silica particles, a special low temperature degassing procedure was followed as described in Example 3.

As used herein, the phrase "particle size" refers to median particle size (D50, which is a volume distribution with 50 volume percent of the particles are smaller than this number and 50 volume percent of the particles are bigger than this number in size) measured by dynamic light scattering when the particles are slurried in water or an organic solvent such as acetone or ethanol.

The silica particles used to form the matting agents of the present invention may also have a BET particle surface area of at least about 10 $m^2/g$ up to about 2000 $m^2/g$ (or any value greater than 10 $m^2/g$ up to and including 2000 $m^2/g$, in increments of 1.0 $m^2/g$, e.g., 453 $m^2/g$, or any range of values between greater than 10 $m^2/g$ up to and including 2000 $m^2/g$, in increments of 1.0 $m^2/g$, e.g., from about 400 $m^2/g$ to about 444 $m^2/g$), or greater. In some embodiments, the silica has a BET particle surface area of at least about 50 $m^2/g$ up to about 1500 $m^2/g$ (or any value greater than 50 $m^2/g$ up to and including 1500 $m^2/g$, in increments of 1.0 $m^2/g$, e.g., 53 $m^2/g$, or any range of values between 50 $m^2/g$ and 1500 $m^2/g$, in increments of 1.0 $m^2/g$, e.g., from about 400 $m^2/g$ to about 444 $m^2/g$). Preferably, the silica particles used to form the matting agents of the present invention have a BET particle surface area of from about 20 $m^2/g$ up to about 900 $m^2/g$.

The matting agents of the present invention typically have a median particle size of from about 1.0 micron (μm) to about 50 μm (or any value between and including 1.0 μm up to about 50 μm, in increments of 0.1 μm, e.g., 45.0 μm, or any range of values between and including 1.0 μm up to about 50 μm, in increments of 0.1 μm, e.g., from about 3.2 μm to about 50.1 μm). However, it should be understood that the matting agents of the present invention may have any median particle size depending on the use of the particles. In some embodiments, the matting agents of the present invention have a median particle size of from about 2.0 μm to about 20.0 μm. In some embodiments, the matting agents of the present invention have a median particle size of from about 3.0 μm to about 15.0 μm When the silica based matting agents of the invention comprise composite particles, the particles may comprise one of more waxes. The one or more waxes may comprise, but are not limited to, a hydrocarbon wax (i.e., a wax comprising relatively long alkyl chains, e.g., alkyl chains having 20 or more carbon atoms therein, with or without one or more various functional groups such as fatty acids, primary and secondary long chain alcohols, unsaturated bonds, aromatics, amides, ketones, and aldehydes), a paraffin wax (i.e., from 20-40 carbon atoms without additional functional groups), a polyethylene wax, a polypropylene wax, a plant wax such as a carnauba wax (i.e., Brazil wax), an animal wax such as bee wax, or any combination thereof.

Commercially available waxes that are suitable for use in the present invention include, but are not limited to, waxes available from Mitsui Chemicals, LLC (Osaka, Japan) under the trade designations Hi-WAX™ or EXCEREX™ waxes, waxes available from Honeywell Performance Additives (Morristown, NJ) under the trade designations RHEOLUB® waxes; and waxes available from TH.C.TROMM GmbH (Cologne, Germany) under the trade designations Polarwachs® waxes.

In some embodiments, the matting agent comprise composite particles comprising porous silica particles with a polyethylene wax, a polypropylene wax, or a combination thereof. In some desired embodiments, the composite particles comprise a polyethylene wax having an average molecular weight of at least 2000. Such a relatively high molecular weight polyethylene wax is commercially available from TH.C.TROMM GmbH (Cologne, Germany) under the trade designations Polarwachs® wax.

In another embodiment of this invention, the composite particle matting agents of the present invention may comprise one or more polymers, alone or in combination with the above-described one or more waxes. When present, the one or more polymers may comprise, but are not limited to, one or more polymers comprising: a polydiene (e.g., polyisoprene, polybutadiene, or a combination thereof), a vulcanized polydiene, a polyacrylamide, a polyvinyl polypyrrolidone, a cellulose acetate butyrate, or any combination thereof. In some desired embodiments, the one or more polymers comprise a polydiene, a vulcanized polydiene, or any combination thereof.

Commercially available polymers that are suitable for use in the present invention include, but are not limited to, polymers available from Kuraray Co., LTD (Tokyo, Japan) under the trade designations KL-10 liquid rubber polymer (i.e., polyisoprene).

Composite silica particles useful in the present invention may be prepared by contacting the porous silica particles with (i) one or more waxes, (ii) one or more polymers, or (iii) any combination of (i) and (ii) in a manner sufficient to provide composite particles having a total pore volume of less than or equal to about 1.2 cc/gm (or any value below 1.00 cc/gm, in increments of 0.01 cc/gm, as discussed above) as determined by the BJH method. Any conventional method may be used to contact the porous silica particles with (i) one or more waxes, (ii) one or more polymers, or (iii) any combination of (i) and (ii) so as to provide the composite particles. In some embodiments, the contacting step may be a wet process. The wet contacting process step may comprise dissolving (i) the one or more waxes, (ii) the one or more polymers, or (iii) any combination of (i) and (ii) in a solvent to form a solvent mixture; incorporating the porous silica particles into the solvent mixture; and removing or evaporating the solvent from the solvent mixture, to form the composite particles.

The composite silica particles may thereafter be subjected to size reduction. Any known method of reducing the particle size may be used, and include, but are not limited to, a milling step such as ball mill or a mortar pestle grinding step. In one embodiment, the composite particles are subjected to a size reduction step, wherein the median particle size of the silica-based particles is reduced to a first median particle size of less than about 500 microns (um). Once reduced in size, the silica-based particles are desirably heat treated at an elevated temperature for a heat treatment period of time. Typically, the elevated temperature is from about 90° C. to about 140° C. (or any value between 90° C. up to and including 140° C., in increments of 1.0° C., for example, about 100° C., or any range of values between 90° C. up to and including 140° C., in increments of 1.0° C., for example, from about 91.0° C. to about 102.0° C.) Typically, the heat treatment period of time ranges from about 1.0 hour (hr) to about 4.0 hr (or any value between 1.0 hr up to and including 4.0 hr, in increments of 1.0 minute, for example, about 1.0 hr and 9 minutes, or any range of values between 1.0 hr up to and including 4.0 hr, in increments of 1.0 minute, for example, from about 1.0 hr and 9 minutes to about 2.0 hr and 5 minutes).

In one exemplary embodiment in which one or more wax coatings are present, the elevated temperature of the heat treatment step ranges from about 100° C. to about 130° C., and the heat treatment period of time ranges from about 1.0 hr to about 1.5 hr. In another exemplary embodiment in which one or more polymers are present, the elevated temperature of the heat treatment step ranges from about 90° C. to about 100° C., and the heat treatment period of time ranges from about 2.5 hr to about 3.5 hr.

Following any optional heat treatment step, the heat-treated silica-based particles are allowed to cool. Once cooled, the heat-treated silica-based particles may optionally be further reduced in size so as to result in a final particle size of less than about 100 μm (or any value less than about 100 μm, in increments of 1.0 μm, for example, about 45.0 μm, or any range of values between about 1.0 μm up to and including 100 μm, in increments of 1.0 μm, for example, from about 4.0 μm to about 6.7 μm). As discussed above, any known method of reducing particle size may be used. In one exemplary embodiment, a milling step may be utilized so as to result in silica-based particles having a final particle size of less than about 45.0 μm.

In other exemplary embodiments, the contacting step may not involve any solvent and therefore be a dry process. In one embodiment, the dry process may comprise melting (i) the one or more waxes, (ii) the one or more polymers, or (iii) any combination of (i) and (ii) to form a liquid coating; and incorporating the porous silica particles into the liquid coating. In yet other embodiments, the dry process may comprise simultaneously contacting and mixing (a)(i) the one or more waxes, (ii) the one or more polymers, or (iii) any combination of (i) and (ii), and (b) the porous silica particles in a conventional mixer such as a ribbon blender, a Henschel mixer, a twin screw extruder, a fluid energy mill (FEM) or a micronizing jet mill at high temperature (i.e., a temperature that melts any waxes and/or polymers if needed). In these embodiments, the heating and particle size reduction steps are combined and additional particle size reduction may or may not be necessary.

In some exemplary embodiments, crosslinking of polymer coated porous silica particles is desirable for even better stability and properties. In some exemplary embodiments, the crosslinking comprises a vulcanization step. In methods that comprise a vulcanization step, elemental sulfur, a vulcanization promoter, or both, may be added to the one or more polymers during the contacting step. Suitable vulcanization promoters for use in the present invention include, but are not limited to, elemental sulfur, and butyl zimate.

Coating Compositions

The matting agents of present invention are useful to prepare coating compositions comprising aqueous suspensions or dispersions of the herein-described silica-based matting agents. In a preferred embodiment, the coating composition is a waterborne or aqueous coating composition, which generally yields a clear coat film upon drying on a substrate. When the substrate is wood, the clear coat film allows the natural color and grain structure of wood, such as, teak, cherry, oak, walnut, mahogany and rose wood, to be visible or substantially visible to the eye, which characteristic may be highly prized in applications, such as, furniture and wood carvings.

The coating compositions may comprise the disclosed silica-based matting agents in addition to various other ingredients used in coating compositions. Examples of other ingredients that can be present in the compositions include, but are not limited to, an aqueous film-forming binder resin, such as a self-crosslinking modified acrylic copolymers emulsion or a latex acrylic binder Neocryl® XK12 (available from Royal DSM, Heerlen, the Netherlands), and a coalescent solvent such as dipropylene glycol n-butyl ether (DOWANOL™ PDnB). The composition may or may not contain color pigments such as organic pigments or titanium dioxide white inorganic pigments, provided that, where the substrate is wood, the natural grain of the word remains substantially visible to the eye. When the composition contains a color pigment, a dispersant may also be included in the formulation.

The balance of the composition is typically water. Other diluents can also be included, aside from water, including, but not limited to, aliphatics, aromatics, alcohols, ketones, white spirit, petroleum distillate, esters, glycol ethers, low-molecular weight synthetic resins, and the like. Environmentally friendly diluents, such as water, are preferred.

Other miscellaneous additives can also be included in the compositions, including without limitation, additives to modify surface tension, improve flow properties, improve finished appearance, increase wet edge, improve pigment stability, impart antifreeze properties, control foaming, control skinning, etc. Further additives that can be included in the compositions include without limitation surfactants, catalysts, thickeners, stabilizers, emulsifiers, texturizers, adhesion promoters, UV stabilizers, de-glossing agents, biocides to fight bacterial growth, and the like. Oil can be included as a rheology agent, gloss modifier and protective agent that will reduce damage to the coating that would otherwise result from forming processes and from degrative elements in the service environment of the coated materials.

The coating compositions of the present invention typically comprise (I) from about 1.0 wt % up to about 50.0 wt % (or any value between 1.0 wt % up to and including 50.0 wt %, in increments of 0.1 wt %, for example, about 5.1 wt %, or any range of values between 1.0 wt % up to and including 50.0 wt %, in increments of 0.1 wt %, for example, from about 1.3 to about 4.8 wt %) of the silica-based matting agents, and (II) from about 99.0 wt % to about 50.0 wt % (or any value between 99.0 wt % to and including 50.0 wt %, in increments of 0.1 wt %, for example, about 70.1 wt %, or any range of values between 99.0 wt % to and including 50.0 wt %, in increments of 0.1 wt %, for example, from about 70.3 to about 44.8 wt %) of one or more additional components, with both weight percentages of components (I) and (II) being based on a total weight of the coating composition.

Uses

The present invention is even further directed to the use of the silica-based matting agents in various coating applications/processes. When used as a matting agent in coating compositions, the herein-described silica-based particles provide improved chemical resistance in addition other desirable properties such as improved thermal stress resistance, improved weather resistance, improved film clarity, or any combination thereof in the final coating.

In a preferred embodiment, the silica-based matting agents of the invention are useful in methods of improving chemical resistance of a film resulting from an aqueous coating composition applied to a substrate. In another embodiment, the silica-based matting agents of the invention are useful in methods of improving chemical resistance simultaneously with improving film clarity of a clear cut film resulting from an aqueous film coating composition applied to a substrate.

In a particularly preferred embodiment, the substrate is a wood subtrate. In one desired embodiment, a wood substrate is treated with an aqueous coating composition thereof, wherein the coating composition comprises the silica-based matting agents of the invention on a surface of the wood substrate. Other substrates which may be coated with coating compositions in accordance with the present invention include, but are not limited to, leather, plastics (e.g,vinyl), metal (e.g., coil) or metal alloys, cement or concrete or other industrial finishes.

Generally, the method of utilizing a matting agent in a coating composition in accordance with the invention comprises incorporating the inventive silica-based matting agents into a coating composition, preferably an aqueous coating composition, prior to applying the coating composition onto the substrate. The typical incorporation step includes mixing or dispersing the matting agents into the formulation. The method of applying the coating composition to a substrate includes brushing, rolling, air spraying, or drawdowning or other possible methods.

As discussed further in the examples below, incorporation of the silica-based particle matting agent of the current invention into an aqueous coating composition and subsequently applying the coating composition on a substrate with drying, provide coated films with improved chemical resistance alone or in combination with improved film clarity when compared to known coatings/films that do not contain the silica-based matting agents of the present invention.

For example, in some embodiments, a coating composition comprising the silica-based matting agents (i.e., uncoated low porosity silica particles and/or silica-based composite particles) in an amount sufficient to achieve a 60° gloss value between 10.0 and 15.0 in a dried film, results in a clear coat film on a substrate, wherein the film exhibits a water damage 24 hr ΔL* of less than 6.00 units (or any value less than 6.00 units, in increments of 0.01 units, for example, 2.34 units, or any range of values less than 6.00 units, in increments of 0.01 units, for example, from about 1.02 units to about 2.64 units) as measured using a portable Spectro-Guide 45/0 colorimeter and the method described in the examples below.

In some embodiments, a coating composition comprising the silica-based matting agents of the invention (i.e., uncoated low porosity silica particles and/or silica-based composite particles) in an amount sufficient to achieve a 60° gloss value between 10.0 and 15.0 in a dried film results in a coated film on a substrate, wherein the film exhibits a water damage 24 hr ΔL* of less than 6.00 units (or any value less than 6.00 units, in increments of 0.01 units, for example, 2.34 units, or any range of values less than 6.00 units, in increments of 0.01 units, for example, from about 1.02 units to about 2.64 units) as measured using a portable Spectro-Guide 45/0 colorimeter and the method described in the examples below.

In some embodiments, a coating composition comprising the inventive silica-based matting agents (i.e., uncoated low porosity silica particles and/or silica-based composite particles) in an amount sufficient to achieve a 60° gloss value between 10.0 and 15.0 in a dried film, results in a coated film on a substrate, and the film exhibits a 50/50 water/ethanol damage 1 hr ΔL* of less than 13.00 units (or any value less than 13.00 units, in increments of 0.01 units, for example, 6.85 units, or any range of values less than 13.0 units, in increments of 0.01 units, for example, from about 2.12 units to about 10.85 units) as measured using a portable Spectro-Guide 45/0 colorimeter and the method described in the examples below.

In some embodiments, a coating composition comprising the herein-described matting agents (i.e., uncoated low porosity silica particles and/or silica-based composite particles) in an amount sufficient to achieve a 60° gloss value between 10.0 and 15.0 in a dried film, results in a coated film on a substrate, and the film exhibits a 50/50 water/ethanol damage 4 hr ΔL* of less than 15.0 units (or any value less than 15.0 units, in increments of 0.01 units, for example, 7.17 units, or any range of values less than 150.0 units, in increments of 0.01 units, for example, from about 4.70 units to about 14.64 units) as measured using a portable Spectro-Guide 45/0 colorimeter and the method described in the examples below.

In some desired embodiments, films having the above mentioned improvements in chemical resistance also exhibit, a film clarity ΔL* of less than 7.0 units (or any value less than 7.0 units, in increments of 0.1 units, for example, 2.4 units, or any range of values less than 7.0 units, in increments of 0.1 units, for example, from about 1.2 units to about 2.4 units) as measured using a portable Spectro-Guide 45/0 colorimeter and the method described in the examples below.

In some desired embodiments, a coating composition comprising the herein-described silica-based matting agents in an amount sufficient to achieve a 60° gloss value of between 10.0 to 15.0 units in a dried clear coat film coated on a substrate, wherein film exhibits one or more or all of (a) a water damage 24 hr ΔL* of less than 6.00 units (or any value less than 6.00 units, in increments of 0.01 units, for example, 2.34 units, or any range of values less than 6.00 units, in increments of 0.01 units, for example, from about 1.02 units to about 2.64 units) as measured using a portable Spectro-Guide 45/0 colorimeter and the method described in the examples below, (b) a 50/50 water/ethanol damage 1 hr ΔL* of less than 13.00 units (or any value less than 13.00 units, in increments of 0.01 units, for example, 6.85 units, or any range of values less than 13.0 units, in increments of 0.01 units, for example, from about 2.12 units to about 10.85 units) as measured using a portable Spectro-Guide 45/0 colorimeter and the method described in the examples below, (c) a 50/50 water/ethanol damage 1 hr ΔL* of less than 13.0 units (or any value less than 13.0 units, in increments of 0.01 units, for example, 6.85 units, or any range of values less than 13.0 units, in increments of 0.01 units, for example, from about 2.12 units to about 10.85 units) as measured using a portable Spectro-Guide 45/0 colorimeter and the method described in the examples below, and (e) a film clarity ΔL* of less than 7.0 units as measured using a portable Spectro-Guide 45/0 colorimeter and the method described in the examples below.

While not wishing to be bound by any particular theory, it is hypothesized that the improved properties of chemical resistance attributable to the improved silica-based matting agents, and resulting compositions and films, may be due to one or more of the following factors: 1) the coated organics such as wax or polymers at least partially fill the pores of the silica and which provides a reduction of particle shrinkage during exposure to the solvent and drying; 2) the coated organics lead to improved adhesion between matting particle and the latex; 3) the coated organics have the ability for wax/organic coating to better flow and fill in cracks as they form; 4) the coated organics lead to reduced stress on the latex-particle interface due to the softening of the latex in the region surrounding the particle, and 5) diffusion of the wax and/or organic into at least some of the pores of the film, thereby reducing penetration of water, ethanol or other solvent into the film.

It should be understood that although the above-described silica-based matting agents, methods and uses are described as "comprising" one or more components or steps, the above-described silica-based particles, methods and uses may "comprise," "consists of," or "consist essentially of" any of the above-described components or steps of the silica-based particles, methods and uses. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a silica-based particle, method and/or use that "comprises" a list of elements (e.g., components or steps) is not necessarily limited to only those elements (or components or steps), but may include other elements (or components or steps) not expressly listed or inherent to the silica-based particle, method and/or use.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define composite particles, methods and/or uses that include materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

The following examples describe (i) processes in accordance with the present invention for preparing silica-based particles, and (ii) the evaluation of the silica-based particles in coating compositions.

Draw down procedures and gloss (Matting efficiency), Film Clarity and Chemical Resistance Measurement Methods used in the following Examples were as follows:

Drawdown Procedure and Drawdown Cards

Drawdowns were carried out with a wire wound lab rod from Gardner Company with wire size of 40. With this size, the wet film thickness was about 100 μm. After drying, the dry film thickness was around 30-35 μm. The drawdown plates used were 219×286 mm² plain black charts from Leneta Company, Inc. (Mahwah, NJ). The procedure for each drawdown was as follows:

1. In a dust free clean room, a blank drawdown plate was placed on a vacuum holder.
2. Using a pipette, about 2-5 ml of a well-mixed coating composition sample was positioned on and near the top of a sample sheet.
3. The ends of the drawdown rod were immediately grasped. Using the thumbs of both hands to keep the rod from bowing or bending away from the sample, the drawdown rod was drawn down through the liquid pool, spreading and metering the fluid across the sample sheet. After a given drawdown was made, the drawdown rod was immersed in a cleaning tray after use.
4. After the drawdown, the drawdown samples were left at room temperature for at least four days to allow complete drying of the coated layer.
5. After the coated drawdown plate was dry, chemical resistance, film clarity, matting efficiency and cold check tests were carried out using the procedures below.

Gloss (Matting Efficiency), Film Clarity and Chemical Resistance Measurement and Test Methods:

A portable Micro-TRI-Gloss meter (from BYK-Gardner USA, Columbia, MD) was used for film gloss reading. 60° gloss values were measured and reported.

For film clarity and chemical damage check, a portable Spectro-Guide 45/0 colorimeter (also from BYK-Gardner) was used. The L* values were obtained by readings of the colorimeter on a given coated film. On the card with black background, unmatted stock solution (from Example 6) gave an L* value of around 7.9. The addition of a matting agent (e.g., silica) in the stock solution made the film whiter (i.e., resulting in a higher L* value) and the film clarity matted film was defined as the difference between the new L* value and the L* value from the film formed out of the stock solution containing no matting agent.

Chemical Resistance test methods used were similar to European standard specifications EN 12720/DIM 68861-1. Resistances towards deionized water and 50/50 ethanol in water were tested. The test were carried out as follows 1. Circles (1 inch in diameter) were cut out of a Fisher-brand filter paper.
2. Circles were soaked in either water or 50/50 ethanol/water for 30 seconds.
3. Each soaked circle was placed onto a dried drawdown card, and then covered with a weighing boat to prevent evaporation.
4. After a certain amount of time (i.e., 24 hours for water test, and 1 hour and 4 hours for the 50/50 ethanol in water), the weighing boat and paper were removed.
5. A white mark in the contact area developed over time, and after overnight, the L* values were measured using the Spectro-Guide 45/0 colorimeter.
6. The chemical damage (inversely related to the chemical resistance) was defined as the difference between the L* value of the white mark (i.e., the largest reading out of at least three readings) and surrounding undamaged background of the film. The percentage of change was also calculated.

Formation of A Stock Solution For Testing of Coating Compositions

The components listed in Table 1 below were combined as described below to form a stock solution for testing coating compositions.

TABLE 1

Stock Solution For Testing of Coating Compositions

| Raw Material | Trade Designation | Supplier | Weight (g) |
|---|---|---|---|
| film-forming binder | NEOCRYL ® XK-12 acrylic copolymer emulsion | DSM Coating Resins, LLC | 77.43 |
| deionized water | none | | 11.07 |
| a coalescent | DOWANOL ™ PDnB | Dow Chemical | 8.85 |
| surfactant | BYK ® 024 | BYK | 0.55 |
| surfactant | SURFYNOL ® 104E | Air Products | 1.11 |
| thickener | RHEOLATE ® 299 | Elementis | 0.22 |
| surfactant | BYK ® 346 | BYK | 0.77 |

77.43 grams (g) of a film-forming binder (e.g., NEOCRYL® XK12) and 5.53 g of deionized water were mixed in a first container. 8.85 g of a coalescent (e.g., DOWANOL™ PDnB) and 5.54 g of deionized water were mixed in a second container. Then, the contents of the second container were slowly poured into the first container. The mixture was dispersed at 1500 rpm for 15 minutes using a DISPERMAT® disperser from Gardner Company (Pompano Beach, FL) with a 30 mm wide blade.

0.55 g of a first surfactant (e.g., BYK® 024), 1.11 g of a second surfactant (e.g., SURFYNOL® 104E) and 0.22 g of a thickener (e.g., RHEOLATE® 299) were added to the mixture in the first container. The mixture was then dispersed at 2500 rpm for 10 minutes using the DISPERMAT® disperser.

0.77 g of a third surfactant (e.g., BYK® 346) was added to the mixture in the first container. The mixture was then dispersed at 1000 rpm for 5 minutes using the DISPERMAT® disperser. The resulting mixture then was used as a stock solution, capable of being stored for up to 1 month.

Formation of Coating Compositions Comprising a Matting Agent and The Stock Solution Coating compositions comprising a matting agent and the stock solution of Example 1 were prepared as follows. The goal of using matting agent was to lower the gloss of the coated film, and a target 60° gloss range of between 10.0 and 15.0, or close to 12.5. To achieve this level of gloss, the required amounts of matting agents varied for different samples and were determined from a separate loading study. After a given amount of matting agent was added into a given amount of stock solution formed in Example 1 above, the resulting mixture was dispersed at 2500 rpm for 30 min using the DISPERMAT® disperser, and then allowed to sit overnight at room temperature.

Drawdowns for testing each coating composition were carried out the second day (i.e., the day after making a given coating composition) using the drawdown procedure described above.

Nitrogen Pore Volume and BET Surface Area Measurements of Composite Particle Samples Nitrogen pore volumes of silica and wax composite particles were measured using an Autosorb® iQ analyzer, available from Quantachrome Instrument (Boynton Beach, FL). The degasing for each sample was carried out at 65° C. (i.e., below the melting temperature of the wax of around 80° C.) for 4 hours. Nitrogen adsorption and desorption isotherms were measured at 77K with nitrogen pressure increasing from 0.01% atmosphere to 0.998% atmosphere, and subsequently decreasing from 0.998% atmosphere to 0.025% atmosphere, respectively. The pore volumes were calculated using the AsiQwin™ 5.0 version program based on BJH theory. See, for example, Barrett et al., The Determination of Pore Volume and Area Distributions in Porous Substances. I. Computations from Nitrogen Isotherms, *J. Am. Chem. Soc.*, 1951, 73 (1), pp 373-380, and the BET surface area were also calculations based on the the Brunauer Emmet Teller method (Brunauer, et al., "Adsorption of Gases in Multimolecular Layers". *J. Am. Chem. Soc.* 1938, 60 (2): 309-319), the subject matter of both of which is incorporated herein by reference in their entirety.

Formation of Composite Silica/Wax Particles (Wet Method)

Composite silica/wax particles were formed using a wet method as described below. 2.5-10 grams of wax were dissolved in 60-100 ml of toluene with heating. 10 g of silica particles were mixed with the wax solution. The mixture was left in a crystallizing dish in a well-ventilated fume hood overnight to allow all of the solvent to evaporate. The "dried" residue was subjected to mortar pestle grinding to allow all the particles to pass a 500 μm screen. The screened particles were then subsequently heated at 130° C. for 1 hour. After drying, the particles were cooled down and the particle size was further reduced with an analytical mill to enable the particles to pass a 45 μm screen. The screened particles were suitable for use, as is, directly in, for example, a paint formulation.

Formation of Composite Silica/Polymer Particles Utilizing A Vulcanization Step (Wet Method):

Composite silica/polymer particles were formed using a wet method with vulcanization as described below. 4.3 grams of polymer (e.g., polyisoprene, 10 kD MW, mostly trans-, KL-10, commercially available from Kuraray) were dissolved in 60 ml of toluene. 0.24 g of elemental sulfur and 0.12 g of butyl zimate (commercially available from Vanderbilt Chemicals, LLC) were added to the solution and mixed well. 10 g of silica particles were mixed with the solution. The mixture was left in a crystallizing dish in a well ventilated fume hood overnight to allow all of the solvent to evaporate. The "dried" residue was then subjected to mortar pestle to allow all the particles to pass a 500 μm screen. The screened particles were subsequently heated at 95° C. for 3 hours. After that, the particles were cooled down and the particle size was further reduced with an analytical mill to enable most of the particles to pass a 45 μm screen. The screened particles were suitable for use, as is, directly in, for example, a paint formulation.

Formation of Composite Silica/Polymer Particles Without Utilizing A Vulcanization Step (Wet Method)

Composite silica/polymer particles were formed using a wet method without vulcanization as described below. 7.0 grams of polymer (e.g., polyisoprene, 10 kD MW, mostly trans-, KL-10, commercially available from Kuraray) were dissolved in 60 ml of toluene. 10 g of silica particles was mixed with the solution. The mixture was left in a crystallizing dish in a well ventilated fume hood overnight to allow all of the solvent to evaporate. The "dried" residue was then subjected to mortar pestle to allow all of the particles to pass a 500 μm screen. The screened particles were subsequently heated at 70° C. for 3 hours. After that, the particles were cooled down and the particle size was further reduced with an analytical mill to enable most of the particles to pass a 45 μm screen. The screened particles were suitable for use, as is, directly in, for example, a paint formulation.

Formation of Composite Silica/Wax Particles with Melting and Mixing (Dry Method)

Composite silica/wax particles were formed using a dry method as described below. 4 kg of silica particles were mixed with 4 kg of a wax (e.g., POLARWACHS® N481 polyethylene wax) under nitrogen in a 10 L Henscher Mixer. The mixer was heated to 120° C. for 2 hours. The mixture was mixed with 3000 rpm for 2 hours. The sample was then cooled down to room temperature.

Formation of Composite Silica/Wax Particles with Melting and Milling (Dry Method)

Composite silica/wax particles were formed using a dry method as described below. 4 kg of silica particles (~30 μm particle size, 1.9 cc/gm pore volume) were mixed with 4 kg of a wax (e.g., POLARWACHS® N481 polyethylene wax) under nitrogen in a 10 L Henscher Mixer. The mixer was heated to 120° C. for 2 hours. The mixture was mixed with 3000 rpm for 2 hours. The sample was then cooled down to room temperature, and the composite was subjected to a fluid energy mill under nitrogen to bring the particle size down to 9 μm (median particle size).

EXAMPLE 1

Comparison of Pore Volumes of Silica and Its Effect On Matting Efficiency and Chemical Resistance of Silica-Containing Coating Compositions Table 2 below lists physical properties of five different silica samples used in the examples. All silica particles were commercially available from W. R. Grace & Co. and were used as is (i.e., no wax or polymer coating) for physical property testing.

Three coating compositions using the first three silicas (i.e., silica samples 1-3) were formed using the procedure discussed above (i.e., Formation of Coating Compositions Comprising A Matting Agent and The Stock Solution) using 3.0 wt % the silica and 97 wt % of the stock solution. The chemical resistance of each coating composition was evaluated at 60° gloss value of 10.0-15.0, and the chemical damages (50/50 ethanol/water damage, 1 hr (ΔL*)) were determined to be reversely related to the silica particle pore volume. As shown in Table 2 below, Silica Sample 3 with a pore volume of 0.40 cc/gm resulted in a 50/50 ethanol/water damage, 1 hr (ΔL*) of less than 5 units.

TABLE 2

Pore Volumes, BET Surface areas of Five Silicas and Chemical Resistance Testing of Three Silica-Containing Coating Compositions

| Sample Number | Silica type | Median Particle size (μm) | BJH Pore Volume (cm$^3$/gm) | BET Surface Area (m$^2$/gm) | 60° Gloss | 50/50 Ethanol/Water Damage 1 hr (ΔL*) |
|---|---|---|---|---|---|---|
| Silica Sample 1 | Silica gel | 7 | 1.9 | 350 | 10.9 | 19.77 |
| Silica Sample 2 | Silica gel (dried hydrogel) | 7 | 1.2 | 320 | 14.1 | 10.12 |
| Silica Sample 3 | Silica gel | 6 | 0.4 | 700 | 10.3 | 4.87 |
| Silica Sample 4 | Silica gel | 8 | 1.2 | 300 | n/a | n/a |
| Silica Sample 5 | Silica gel | 9 | 1.9 | 350 | n/a | n/a |

EXAMPLE 2

Formation of Composite Particles of the Invention

Composite particles were prepared using the materials shown in Table 3 below. Silica composite samples 1-7 and 9 were formed using Silica Samples 1 and 4 described in Table 2 above. For Silica Composite 8, prior to applying wax, Silica Sample 1 described in Table 2 above was washed with dilute NaOH (pH 10), and then dried at 90° C. overnight. As a result of the washing process, the pore volume of the silica dropped from 1.9 cc/gm to 1.2 cc/gm.

Nine silica composite samples were prepared using the wet or dry silica/wax composite particle forming procedures discussed above. Comparative Silica Sample 1, shown in Table 3 below, was Silica Sample 1 shown in Table 2 without any modifications (i.e., no wax or polymer).

TABLE 3

Composite Particle Sample Formulations

| Sample Number | Starting Silica Particles | Amount of Wax (g) | Amount of Silica (g) | Wax Content in Composite | Preparation Method (dry/wet) |
|---|---|---|---|---|---|
| Silica Composite 1 | Silica Sample 1 | 2.5 | 10.0 | 20% | wet |
| Silica Composite 2 | Silica Sample 1 | 4.3 | 10.0 | 30% | wet |
| Silica Composite 3 | Silica Sample 1 | 4,300 | 10,000 | 30% | dry |
| Silica Composite 4 | Silica Sample 1 | 7.0 | 10.0 | 40% | wet |
| Silica Composite 5 | Silica Sample 1 | 7,000 | 10,000 | 40% | dry |
| Silica Composite 6 | Silica Sample 1 | 10.0 | 10.0 | 50% | wet |
| Silica Composite 7 | Silica Sample 1 | 10,000 | 10,000 | 50% | dry |
| Silica Composite 8 | NaOH treated and dried Silica Sample 1 | 2.5 | 10.0 | 20% | wet |
| Silica Composite 9 | Silica Sample 4 (silica gel) | 2.5 | 10.0 | 20% | wet |
| Comparative Silica Sample 1 | Silica Sample 1 | Non-wax coated; used as is | | | |

As shown in Table 3, Silica Composite 8 comprised the above-described modified silica combined with 20 wt % wax. The measured pore volume for Silica Composite 8 was 0.53 cc/gm.

EXAMPLE 3

Formation of Specific Coating Compositions

Each matting agent-containing coating composition was prepared using the procedures described above (i.e., Formation of Coating Compositions Comprising A Matting Agent and The Stock Solution). After formation, each matting agent-containing coating composition was drawdown using the draw-down procedure described above. After drying at room temperature for at least 4 days, each of the resulting films was evaluated for gloss, and chemical resistance according to the methods described above. Pore volumes and BET surface areas of each samples were also measured using the procedure described above. Table 4 below summarizes the results.

TABLE 4

Test Results for Coatings Containing Composite Particle Samples and a Comparative Particle Sample

| Sample Number | % Matting agent in Coating | 60° Gloss | Measured PV (cm$^3$/gm) | Measured BET Surface Area (m$^2$/gm) | Water Damage 24 hr (ΔL*) | 50/50 Damage 1 hr (ΔL*) | 50/50 Damage 4 hr (ΔL*) |
|---|---|---|---|---|---|---|---|
| Silica Composite 1 | 3.75 | 13.3 | 1.20 | 210 | 5.13 | 12.68 | 14.64 |
| Silica Composite 2 | 4.29 | 11.6 | 0.93 | 150 | 4.68 | 10.85 | 11.18 |
| Silica Composite 3 | 4.28 | 14.5 | 0.85 | n/a | 3.28 | 6.93 | 7.64 |
| Silica Composite 4 | 5.00 | 12.9 | 0.55 | 86 | 3.08 | 6.85 | 8.41 |
| Silica Composite 5 | 5.00 | 15.0 | 0.53 | 67 | 2.39 | 5.33 | 7.40 |
| Silica Composite 6 | 6.00 | 13.3 | 0.25 | 40 | 1.00 | 1.90 | 4.71 |
| Silica Composite 7 | 6.00 | 13.9 | 0.19 | 25 | 0.81 | 2.12 | 4.70 |
| Silica Composite 8 | 4.00 | 13.6 | 0.53 | 135 | 3.59 | 6.11 | 6.39 |
| Silica Composite 9 | 3.50 | 13.8 | 0.68 | 163 | 3.13 | 6.26 | 5.95 |
| Silica Sample 1 | 3.00 | 10.9 | 1.90 | 350 | 10.54 | 19.77 | 20.55 |

As shown in Table 4 above, within a comparable gloss range of 10.0-15.0, achieved by different levels of matting agents in the formulations, different samples had different performance with the results showing that with lower pore volumes (PV) of the composite particles, a lower ΔL* value is unexpectedly obtained.

Plots of the ΔL* values for water damage, 50/50 water/ethanol damage at 1 hr, and 50/50 water/ethanol damage at 4 hrs show linear relationships as shown in the chart of FIG. 1. As shown in FIG. 1, with low pore volumes of the silica/wax composite particle-containing compositions, significantly reduced water and chemical damage is unexpectedly obtained.

As discussed in the detail description above, while not wishing to be bound by any particular theory, the following could be contributing to the improved chemical/thermal stress resistance of the composite particles: (1) wax/organics can reduce particle shrinkage during drying; (2) wax/organics can give improved adhesion between matting particle and the latex; (3) wax/organics can be more plastic than the particles and the latex allowing it to flow in crack as it forms; (4) wax/organics can soften the latex in the region surrounding the particle thus reducing stress on the latex-particle interface; and (5) wax/organics can diffuse into the latex reducing penetration of water and ethanol into the film.

EXAMPLE 5

Particle Pore Shrinkage After Exposure to 50/50 Ethanol/Water

To demonstrate the effect of reduced pore shrinkage upon exposure to solvents and redrying with wax inside the pores, the following example is provided. A matting agent, 2.0 g, was soaked with 4 ml of 50/50 ethanol/water and then the particles were first dried in air for 6 hours and then at 60° C. for 12 hours. The particles were then subjected to heat treatment at 500° C. in air (calcination) to completely remove the organics, and then the pore volume measurements were carried out as described above. Analyses are given in Table 5.

Table 5 lists the pore volumes of no exposure (but calcinated) and after exposed to 50/50 ethanol/water and calcinated (as described above):

TABLE 5

Pore Volume Change Due to Exposure to 50/50 Ethanol/Water After Calcination

| Samples | Wax Content | PV (No Exposure) (cm³/gm) | PV (After Exposure) (cm³/gm) | PV Change (cm³/gm) | % Change (from No Exposure) |
|---|---|---|---|---|---|
| Comparative Silica Sample 1 | 0 | 1.90 | 1.46 | −0.44 | −23.1% |
| Silica Composite 1 | 20% | 1.84 | 1.59 | −0.25 | −13.4% |
| Silica Composite 2 | 30% | 1.84 | 1.64 | −0.20 | −10.8% |
| Silica Composite 4 | 40% | 1.80 | 1.69 | −0.12 | −6.4% |
| Silica Composite 6 | 50% | 1.75 | 1.69 | −0.06 | −3.6% |

As can be seen in Table 5, a reduced amount of shrinkage of particle pores took place with higher wax levels, showing that the higher the wax content, the less pore volume change after exposure and drying.

EXAMPLE 6

Film Clarity Comparison of Silica Composite to Silica and Organic Matting Agents Table 6 shows two silica composite samples, their uncoated silica precursor, and two pure organic matting agents (Ceraflour® is a trade mark of BYK). Ceraflour® 920 is urea-formaldehyde based matting agent, and Ceraflour® 929 is micronized polyethylene organic matting agent. The pore volume comparison of the two silica composite samples as well as Silica Sample 2 is listed in the table. Film clarity test is described above.

TABLE 6

Film Clarity Comparison for Different Matting Agents

| Samples | Wax Content | Pore Volume | Coated Film Gloss (60° gloss value) | Coated Film Clarity (ΔL* value) |
|---|---|---|---|---|
| Silica Composite 10 | 22% Silica Sample 5 + 22% Wax) | 1.15 | 14.4 | 5.44 |
| Silica Composite 11 | 50% (Silica Sample 5 + 50% Wax) | 0.19 | 13.5 | 5.89 |
| Silica Sample 5 | 0% | 1.90 | 11.9 | 6.05 |
| Ceraflour® 920 | Pure urea-formaldehyde Matting Agent | n/a | 12.9 | 7.56 |
| Ceraflour® 929 | Pure Micronized Polyethylene Matting Agent | n/a | 13.2 | 7.56 |

As shown in the table, the data indicates that the silica composite samples have similar film clarity as that of pure silica sample (Silica Sample 5), while pure organic-based matting agents have higher ΔL* values (i.e., "whiter" coatings or worse film clarity).

While the invention has been described with a limited number of embodiments, these specific embodiments are not intended to limit the scope of the invention as otherwise described and claimed herein. It may be evident to those of ordinary skill in the art upon review of the exemplary embodiments herein that further modifications, equivalents, and variations are possible. All parts and percentages in the examples, as well as in the remainder of the specification, are by weight unless otherwise specified. Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_U$, is disclosed, any number R falling within the range is specifically disclosed. In particular, the following numbers R within the range are specifically disclosed: $R=R_L+k(R_U-R_L)$, where k is a variable ranging from 1% to 100% with a 1% increment, e.g., k is 1%, 2%, 3%, 4%, 5% . . . . 50%, 51%, 52% . . . . 95%, 96%, 97%, 98%, 99%, or 100%. Moreover, any numerical range represented by any two values of R, as calculated above is also specifically disclosed. Any modifications of the invention, in addition to those shown and described herein, will become apparent to those skilled in the art from the foregoing description and accompanying drawings. Such modifications are intended to fall within the scope of the appended claims. All publications cited herein are incorporated by reference in their entirety.

What is claimed is:

1. A matting agent for aqueous coating compositions, said matting agent comprising composite silica particles consisting of porous silica particles and a coating of (i) one or more waxes, (ii) one or more polymers, or (iii) any combination of (i) and (ii) at least partially within pores of the porous silica particles; wherein the porous silica particles have a total pore volume of 0.10 cc/gm to 3 cc/gm prior to coating; and the porous silica particles are silica gel, precipitated silica, or fumed silica particles; wherein the composite silica particles comprise from 20 wt. % to 50 wt. %, based on a total weight of said composite silica particles, of one of (i) said one or more waxes, (ii) said one or more polymers, or (iii) any combination of (i) and (ii); and the composite silica particles have a median particle size of greater than 3.0 microns (μm) up to about 50.0 μm, a total pore volume of less than or equal to about 1.2 cc/gm as determined by Barrett-Joyner-Halenda (BJH) method, and a BET surface area of 25 $m^2$/gm to 210 $m^2$/gm; and wherein, when incorporated into an aqueous coating composition in an effective matting amount and the coating composition is applied onto a substrate to form a clear coat film, the matting agent provides increased chemical resistance in the film as compared to a film formed from an aqueous coating composition comprising silica particles having a higher total pore volume as a matting agent.

2. The matting agent of claim 1, when incorporated into an aqueous coating composition in an amount sufficient to achieve, upon drying on a plain, smooth and non-penetrating black chart to form a film, a 60° gloss value between 10.0 and 15.0 in a dried film, and enables the film to exhibit a water damage 24 hr ΔL* of less than 6.0 units as measured using a portable Spectra-Guide 45/0 colorimeter.

3. The matting agent of claim 1, when incorporated into an aqueous coating composition in an amount sufficient to achieve, upon drying on a plain, smooth and non-penetrating black chart to form a film, a 60° gloss value between 10 to 15 in a dried film, and enables the film to exhibit a 50/50 water/ethanol damage 1 hr ΔL* of less than 13.0 units as measured using a portable Spectra-Guide 45/0 colorimeter.

4. The matting agent of claim 3, wherein when incorporated into an aqueous coating composition in an amount sufficient to achieve, upon drying on a plain, smooth and non-penetrating black chart to form a film, a 60° gloss value between 10 to 15 in a dried film, and enables the film to exhibit a 50/50 water/ethanol damage 4 hr ΔL* of less than 15.0 units as measured using a portable Spectra-Guide 45/0 colorimeter.

5. The matting agent of claim 1, when incorporated into an aqueous coating composition in an amount sufficient to achieve, upon drying on a plain, smooth and non-penetrating black chart to form a film, a 60° gloss value between 10.0 to 15.0 in a dried clear coat film, and enables the film composition to exhibit a film clarity ΔL* of less than 7.0 units as measured using a portable Spectra-Guide 45/0 colorimeter.

6. The matting agent of claim 1, wherein said composite silica particles consist of porous silica particles and a coating of one or more waxes.

7. The matting agent of claim 1, wherein said composite silica particles are free-flowing particles.

8. The matting agent of claim 1, wherein a majority of an outer surface area of said composite silica particles comprises silica.

9. The matting agent of claim 1, wherein when incorporated into a coating composition and applied onto a plain, smooth and non-penetrating black chart, enables the coating composition to form a clear coat film having a 60° gloss value between 10.0 to 15.0 as measured using a portable Micro-TRI-Gloss meter.

10. The matting agent of claim 9, wherein the film exhibits (i) a water damage 24 hr ΔL* of less than 6.0 units as measured using a portable Spectra-Guide 45/0 colorimeter, (ii) a 50/50 water/ethanol damage 1 hr ΔL* of less than 13.0 units as measured using a portable Spectro-Guide 45/0 colorimeter, (iii) a 50/50 water/ethanol damage 4 hr ΔL* of less than 15.0 units as measured using a portable Spectra-Guide 45/0 colorimeter, and (iv) a film clarity ΔL* of less than 7.0 units as measured using a portable Spectra-Guide 45/0 colorimeter.

11. The matting agent of claim 9, wherein the film exhibits (i) a water damage 24 hr ΔL* of less than 4.8 units as measured using a portable Spectra-Guide 45/0 colorimeter, (ii) a 50/50 water/ethanol damage 1 hr ΔL* of less than 11.0 units as measured using a portable Spectro-Guide 45/0 colorimeter, (iii) a 50/50 water/ethanol damage 4 hr ΔL* of less than 11.5 units as measured using a portable Spectra-Guide 45/0 colorimeter, and (iv) a film clarity ΔL* of less than 6.5 units as measured using a portable Spectra-Guide 45/0 colorimeter.

12. A coating composition comprising the matting agent of claim 1.

13. The coating composition of claim 12, wherein said composition comprises an aqueous composition.

14. The coating composition of claim 13, when applied onto a plain, smooth and non-penetrating black chart, forms a film having a 60° gloss value between 10.0 to 15.0, as measured using a portable Micro-TRI-Gloss meter, wherein the film exhibits (i) a water damage 24 hr ΔL* of less than 6.0 units as measured using a portable Spectra-Guide 45/0 colorimeter, (ii) a 50/50 water/ethanol damage 1 hr ΔL* of less than 13.0 units as measured using a portable Spectra-Guide 45/0 colorimeter, (iii) a 50/50 water/ethanol damage 4 hr ΔL* of less than 15.0 units as measured using a portable Spectra-Guide 45/0 colorimeter, and (iv) a film clarity ΔL* of less than 6.5 units as measured using a portable Spectra-Guide 45/0 colorimeter.

15. The coating composition of claim 13, when applied onto a plain, smooth and non-penetrating black chart, forms a film having a 60° gloss value between 10.0 to 15.0, as measured using a portable Micro-TRI-Gloss meter, wherein the film exhibits (i) a water damage 24 hr ΔL* of less than 4.8 units as measured using a portable Spectra-Guide 45/0 colorimeter, (ii) a 50/50 water/ethanol damage 1 hr ΔL* of less than 11.0 units as measured using a portable Spectra-Guide 45/0 colorimeter, (iii) a 50/50 water/ethanol damage 4 hr ΔL* of less than 11.5 units as measured using a portable Spectra-Guide 45/0 colorimeter, and (iv) a film clarity ΔL* of less than 6.0 units as measured using a portable Spectra-Guide 45/0 colorimeter.

16. A substrate coated with the coating composition of claim 14.

17. The substrate of claim 16, wherein said substrate comprises a wood substrate.

18. A method of improving chemical resistance of a waterborne composition applied to a wood substrate, said method comprising:
- incorporating the matting agent of claim 1 into the coating composition;
- applying the coating composition onto at least one surface of a wood substrate to form a coating; and
- drying the coating to form a clear coat film on at least one surface of the wood substrate.

* * * * *